United States Patent
Frascati et al.

(10) Patent No.: US 11,971,949 B2
(45) Date of Patent: Apr. 30, 2024

(54) FLEXIBLE-ACCESS INSTRUCTIONS FOR EFFICIENT ACCESS OF ML DATA

(71) Applicant: Samsung Electronics Co., Ltd., Suwon-si (KR)

(72) Inventors: Christopher P. Frascati, Liberty Hill, TX (US); Simon Waters, Cedar Park, TX (US); Rama S. B Harihara, San Jose, CA (US); David C. Tannenbaum, Austin, TX (US)

(73) Assignee: SAMSUNG ELECTRONICS CO., LTD. (KR)

( * ) Notice: Subject to any disclaimer, the term of this patent is extended or adjusted under 35 U.S.C. 154(b) by 654 days.

(21) Appl. No.: 17/173,203

(22) Filed: Feb. 10, 2021

(65) Prior Publication Data

US 2022/0197976 A1 Jun. 23, 2022

Related U.S. Application Data

(60) Provisional application No. 63/128,838, filed on Dec. 21, 2020.

(51) Int. Cl.
*G06F 17/16* (2006.01)
*G06F 9/30* (2018.01)
(Continued)

(52) U.S. Cl.
CPC .......... *G06F 17/16* (2013.01); *G06F 9/30101* (2013.01); *G06F 17/15* (2013.01); *G06N 3/08* (2013.01)

(58) Field of Classification Search
CPC . G06F 17/15–16; G06F 9/30101; G06N 3/08; G06N 3/084
See application file for complete search history.

(56) References Cited

U.S. PATENT DOCUMENTS 9,158,685 B2 10/2015 Biswas et al.
10,672,096 B1 6/2020 Chen et al.
(Continued)

OTHER PUBLICATIONS

A.Anderson, A.Vasudevan, C.Keane, and D.Gregg, "Low-memory GEMM-based convolution algorithms for deep neural networks," arXiv preprint arxXiv:1709.03395, 2017 (Year: 2017).*
(Continued)

*Primary Examiner* — Matthew D Sandifer
(74) *Attorney, Agent, or Firm* — Renaissance IP Law Group LLP (57) ABSTRACT

A graphics processing unit (GPU) and a method is disclosed that performs a convolution operation recast as a matrix multiplication operation. The GPU includes a register file, a processor and a state machine. The register file stores data of an input feature map and data of a filter weight kernel. The processor performs a convolution operation on data of the input feature map and data of the filter weight kernel as a matrix multiplication operation. The state machine facilitates performance of the convolution operation by unrolling the data of the input feature map and the data of the filter weight kernel in the register file. The state machine includes control registers that determine movement of data through the register file to perform the matrix multiplication operation on the data in the register file in an unrolled manner.

20 Claims, 4 Drawing Sheets

(51) Int. Cl.
  *G06F 17/15*   (2006.01)
  *G06N 3/08*    (2023.01)

(56) References Cited

U.S. PATENT DOCUMENTS

| | | | |
|---|---|---|---|
| 11,151,445 B2* | 10/2021 | Fowers | G06N 20/10 |
| 2020/0082215 A1 | 3/2020 | Aliabadi et al. | |
| 2020/0134417 A1* | 4/2020 | Mohapatra | G06F 15/80 |
| 2020/0183833 A1 | 6/2020 | Sakharshete et al. | |
| 2021/0390367 A1* | 12/2021 | Liu | G06F 9/30105 |
| 2022/0405558 A1* | 12/2022 | Shin | G06N 3/045 |
| 2023/0376733 A1* | 11/2023 | Nagarakatte | G06F 17/16 |

OTHER PUBLICATIONS

Cho, Minsik et al., "MEC: Memory-efficient Convolution for Deep Neural Network", arXiv:1706.06873v1 [cs.LG], Jun. 21, 2017, 10 pages.

Li, Xiaqing et al., "Performance Analysis of GPU-Based Convolutional Neural Networks", 2016 45th International Conference on Parallel Processing (ICPP), Aug. 19, 2016, 10 pages.

* cited by examiner

FLEXIBLE-ACCESS INSTRUCTIONS FOR EFFICIENT ACCESS OF ML DATA

CROSS-REFERENCE TO RELATED APPLICATION

This application claims the priority benefit under 35 U.S.C. § 119(e) of U.S. Provisional Application No. 63/128,838, filed on Dec. 21, 2020, the disclosure of which is incorporated herein by reference in its entirety.

TECHNICAL FIELD

The subject matter disclosed herein relates to graphics processing units (GPUs). More particularly, the subject matter disclosed herein relates to a GPU system and a method that improves efficiency of accessing data for three-dimensional (3D) matrices that are often encountered in machine-learning (ML) tasks, thereby reducing storage and memory access overhead.

BACKGROUND

Modern GPUs are used for both graphics-intensive operations and compute-intensive workloads. GPUs typically include a programmable, highly parallel, set of computation engines and a collection of various fixed-function units. Some of the fixed-function units may operate to provide, but not limited to, texture address generation and filtering, primitive clipping, culling, viewport transforming, binning, rasterization setup and rasterization, depth comparisons, blending, and other operations.

Machine learning continues to become more prevalent in consumer products, and has become quite popular in mobile devices. From a high-level perspective, ML may be separated into training tasks, and inferencing tasks. Training on a mobile device may often be a task that is sufficiently compute-intensive that it is likely to be run offline, for example, in the cloud, or if on a mobile device only as a background job off hours. On the other hand, inferencing, which is the application of a ML model, is run in real-time on a mobile device and may involve a large dataset and numerous calculations, although usually for fewer calculations than during training.

Based on the large number of calculations in many ML inferencing operations, many Systems on a Chip (SoCs) may employ a dedicated Neural Processing Unit (NPU) to support various scenarios of ML model types and operand formats. An intent for using an NPU is to provide a more-efficient performance/watt computing unit than may be possible using a central processing unit (CPU) or GPU. While this may be the case for some ML models running with certain input operands, there may be scenarios in which the general-purpose nature of a GPU may be better suited or when the operands are not supported by the NPU (for example, 32-bit floating point (FP32)) may be better suited than using an NPU. In some cases, most of the layers of a ML model may be run in low precision (i.e., int8), but may need one layer to be run in a FP32 precision (like softmax).

SUMMARY

An example embodiment provides a graphics processing unit that may include a register file, a processor and a state machine. The register file may store data of an input feature map and data of a filter weight kernel. The processor may perform a convolution operation on data of the input feature map and data of the filter weight kernel as a matrix multiplication operation. The state machine may facilitate performance of the convolution operation by unrolling the data of the input feature map and the data of the filter weight kernel in the register file. In one embodiment, the state machine may include control registers that determine movement of data through the register file to facilitate the matrix multiplication operation on the data in the register file in an unrolled manner in which the control registers may be configured based on at least one parameter of an input feature map and at least one parameter of a filter weight kernel. The state machine may receive the at least one parameter of an input feature map and the at least one parameter of a filter weight kernel from at least one instruction set architecture instruction. In another embodiment, the unrolled data of the input feature map and the unrolled data of the filter weight kernel may be unrolled based on one of an im2col technique and a Memory-Efficient Convolution technique. In still another embodiment, the state machine may further facilitate matrix multiplying of unrolled data of the input feature map and unrolled data of the filter weight kernel in a first group of registers of the register file while loading a second group of registers of the register file with the unrolled data of the input feature map and the unrolled data of the filter weight kernel, and facilitate matrix multiplying the unrolled data of the input feature map and the unrolled data of the filter weight kernel in the second group of registers of the register file. The state machine may further repeatedly facilitate the matrix multiplication operation on the unrolled data of the input feature map and the unrolled data of the filter weight kernel until the matrix multiplication is complete by facilitating matrix multiplication of the unrolled data of the input feature map and the unrolled data of the filter weight kernel in the first group of registers of the register file while loading the second group of registers of the register file with the unrolled data of the input feature map and the unrolled data of the filter weight kernel, and control matrix multiplication of the unrolled data of the input feature map and the unrolled data of the filter weight kernel in the second group of registers of the register file while loading the first group of registers of the register file with the unrolled data of the input feature map and the unrolled data of the filter weight kernel. In one embodiment, the convolution operation comprises an operation of one of a convolutional neural network, a recurrent neural network, a generative adversarial network and an auto encoder.

An example embodiment provides a graphics processing unit that may include a register file, a shader data path and a state machine. The register file may store data of an input feature map and data of a filter weight kernel. The state machine may facilitate a convolution operation that is to be performed by the shader data path as a matrix multiplication operation by unrolling data and storing the unrolled data in the register file and controlling data movement from the register file and through the shader data path to perform the matrix multiplication operation, the unrolled data comprising the data of the input feature map and the data of the filter weight kernel. In one embodiment, the state machine may include control registers that determine movement of data through the register file and the shader data path to perform the matrix multiplication operation on the data in the register file in an unrolled manner in which the control registers may be configured based on at least one parameter of an input feature map and at least one parameter of a filter weight kernel. The state machine may receive the at least one parameter of an input feature map and the at least one parameter of a filter weight kernel from at least one instruction set architecture instruction. In another embodiment, the unrolled data of the input feature map and the unrolled data of the filter weight kernel may be unrolled based on one of an im2col technique or a Memory-Efficient Convolution technique. In still another embodiment, the state machine may further facilitate matrix multiplying of unrolled data of the input feature map and unrolled data of the filter weight kernel in a first group of registers of the register file while loading a second group of registers of the register file with the unrolled data of the input feature map and the unrolled data of the filter weight kernel, and facilitate matrix multiplying the unrolled data of the input feature map and the unrolled data of the filter weight kernel in the second group of registers of the register file. In yet another embodiment, the state machine may repeatedly further facilitate the matrix multiplication operation on the unrolled data of the input feature map and the unrolled data of the filter weight kernel until the matrix multiplication is complete by facilitating matrix multiplication of the unrolled data of the input feature map and the unrolled data of the filter weight kernel in the first group of registers of the register file while loading the second group of registers of the register file with the unrolled data of the input feature map and the unrolled data of the filter weight kernel, and facilitating matrix multiplication of the unrolled data of the input feature map and the unrolled data of the filter weight kernel in the second group of registers of the register file while loading the first group of registers of the register file with the unrolled data of the input feature map and the unrolled data of the filter weight kernel. The convolution operation may include an operation of one of a convolutional neural network, a recurrent neural network, a generative adversarial network, and an auto encoder.

An example embodiment provides a method to perform a convolution operation in a graphics processing unit as a matrix multiply operation that may include: configuring registers of a state machine in the graphics processing unit based at least one parameter of an input feature map and at least one parameter of a filter weight kernel in which the input feature map may be convolved by the filter weight kernel; receiving memory addresses for data of the input feature map and for data of the filter weight kernel; issuing, by the state machine, an instruction to load registers in a register file of the graphics processing unit with unrolled data of the input feature map and unrolled data of the filter weight kernel; and matrix multiplying the unrolled data of the input feature map and the unrolled data of the filter weight kernel. The unrolled data of the input feature map and the unrolled data of the filter weight kernel may be unrolled based on one of an im2col technique and a Memory-Efficient Convolution technique. The registers of the state machine may be configured by receiving the at least one parameter of the input feature map and the at least one parameter of the filter weight kernel from at least one instruction set architecture instruction; and configuring the registers of the state machine in the graphics processing unit in response to the at least one instruction set architecture instruction. In one embodiment, matrix multiplying the unrolled data of the input feature map and the unrolled data of the filter weight kernel may include: matrix multiplying the unrolled data of the input feature map and the unrolled data of the filter weight kernel in a first group of registers of the register file while loading a second group of registers of the register file with the unrolled data of the input feature map and the unrolled data of the filter weight kernel; and matrix multiplying the unrolled data of the input feature map and the unrolled data of the filter weight kernel in the second group of registers of the register file. In another embodiment, matrix multiplying the unrolled data of the input feature map and the unrolled data of the filter weight kernel may further repeatedly include until the matrix multiply operation on the unrolled data of the input feature map and the unrolled data of the filter weight kernel is complete: matrix multiplying the unrolled data of the input feature map and the unrolled data of the filter weight kernel in the first group of registers of the register file while loading the second group of registers of the register file with the unrolled data of the input feature map and the unrolled data of the filter weight kernel; and matrix multiplying the unrolled data of the input feature map and the unrolled data of the filter weight kernel in the second group of registers of the register file while loading the first group of registers of the register file with the unrolled data of the input feature map and the unrolled data of the filter weight kernel. The convolution operation may include an operation of one of a convolutional neural network, a recurrent neural network, a generative adversarial network, and an auto encoder.

BRIEF DESCRIPTION OF THE DRAWING

In the following section, the aspects of the subject matter disclosed herein will be described with reference to exemplary embodiments illustrated in the figure, in which.

DETAILED DESCRIPTION

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary"

means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. Similarly, various waveforms and timing diagrams are shown for illustrative purpose only. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-chip (SoC), an assembly, and so forth.

The subject matter disclosed herein relates to a GPU system and a method that improves efficiency of accessing data for 3D matrices, such as input feature map data and filter kernel data, that are often encountered in ML tasks, thereby reducing storage and memory access overhead. Thus, the subject matter disclosed herein may include both hardware modules and software modules that cooperate to enhance the efficiency of major functions used for CNN evaluation, i.e., recasting a convolution operation as a matrix multiplication operation. The subject matter disclosed herein may also be extended to RNNs (Recurrent Neural Networks), GANs (Generative adversarial networks) and auto encoders. For certain scenarios, the subject matter disclosed herein may also improve the efficiency of fixed-function units, such as, but not limited to load-store units (LSUs) and local memory units One example embodiment disclosed herein provides an apparatus and a method that improves the efficiency of convolution operations by recasting a convolution operation as a matrix multiplication operation. After process initialization, the data may be prefetched from a main memory and unrolled in a register file of a GPU using, for example, an im2col technique or a Memory-Efficient Convolution (MEC) technique, to recast a convolution operation as a matrix multiplication operation. Address streams may be generated by a state machine that effectively reduces the number of memory fetches directed to supplying the data in the register file, and that removes significant address calculation work from a shader program. The state machine may also generate appropriate cache hints to system memory. Output formats, such as, but not limited to, NHWC (Batch, Height, Width, Channel) may be provided by both the apparatus and the method disclosed herein. Thus, the subject matter disclosed herein may reduce a memory footprint and memory bandwidth requirements for an ML inference evaluation in situations in which an ML inference evaluation targets a GPU.

The subject matter disclosed herein is both sufficiently flexible and sufficiently extensible to operate in conjunction and to support memory packing and cache efficiency techniques that are currently available or that may be developed in the future. Various parameters, both run-time and synthesis time, allow the state machine of the system disclosed herein to evolve with state-of-the-art algorithms for memory packing and cache efficiency techniques that may be developed.

The subject matter disclosed herein provides several instruction set architecture (ISA) level instructions that may be added to a shader to provide efficient access to input feature map data and filter weight data. For example, a fetch instruction, referred to herein as a flexible-access instruction, may use hardware external to a shader core of a GPU to provide efficient fetching and storage of ML input feature map data and weight data into a register file of the GPU, and for the return of computed data. Additionally, the ISA-level instructions may be used to initialize various address calculations that may be performed to facilitate loading data into the shader core so that a convolution operation may be efficiently recast as a matrix multiply operation.

Another example embodiment may include shader software that initializes and configures the hardware, followed by advantageously using hardware to access CNN data, performs convolutions cast as matrix multiplications, and return results back to memory; and further optimized to combine layers of a model and to advantageously perform arithmetic. Still another example embodiment may include driver software that coordinates operations, provides memory management, and interfaces to application-level code, e.g., Neural Network Application Programming Interface (NNAPI), or other intermediate level tools.

A common operation encountered during an inference evaluation is the evaluation of convolutions by a convolutional neural network (CNN). GPUs may, however, be ill-suited for a direct convolution evaluation. In contrast, GPUs may be especially good at matrix multiplication and may achieve a fairly high efficiency for such tasks. Accordingly, the subject matter disclosed herein recasts convolution evaluations as matrix multiplications, thereby making such evaluations more amenable to the capabilities of a GPU.

Figures 1A, 1B:
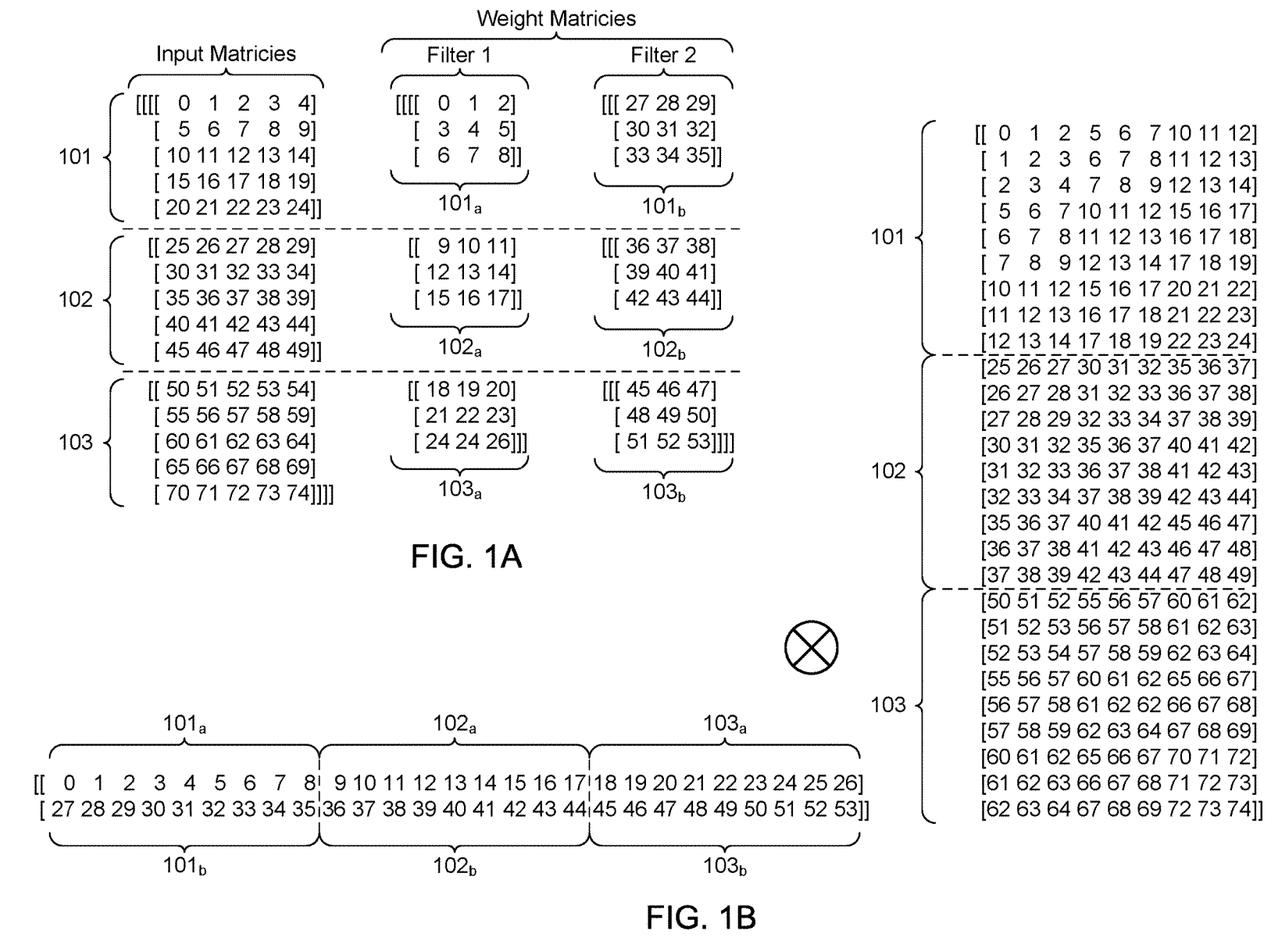
FIG. 1A shows three example input feature maps and two corresponding filter weight kernels for each input feature map.
FIG. 1B shows the example input feature maps and the corresponding filter weight kernels of FIG. 1A unrolled as per the im2col algorithm.

FIG. 1A shows three example input feature maps 101-103. The input feature maps 101-103 may be three channels (RGB) of an image. For this example there are two filter weight kernels that will be applied to each input feature map 101-103. More specifically, filter weight kernels $101_a$ and $101b$ will be applied to the input feature map 101. Filter weight kernels $102_a$ and $102b$ will be applied to the input feature map 102, and filter weight kernels $103_a$ and $103b$ will be applied to the input feature map 103. It should be understood that the data of the input feature maps may be, but is not limited to, image data, audio data, systems data, manufacturing data, signal propagation data, sales and marketing data, financial data, medical data, weather data, scientific data, transportation data, and language data. FIG. 1B shows the example input feature maps 101-103 and the corresponding filter weight kernels of FIG. 1A unrolled as per the im2col algorithm. The numbers shown in the matrices and the filter weight kernels in both FIGS. 1A and 1B are intended to indicate an element identification.

Upon performing the matrix product of the [2-row×27-col]×[27-row×9-col] in FIG. 1B, the result (not shown) is an augmented matrix in which each of the elements is the numerically equivalent result of applying a convolution kernel over an input feature map. Thus, a convolution may be recast as a matrix multiplication. A naïve approach to recasting a convolution operation to a matrix multiplication operation may, however, result in a ~2× to ~9× increase in memory space and overhead to store the input feature map.

It should be noted that the [27-row×9-col] matrix 101 in FIG. 1B includes considerable redundancy in the elements. The subject matter disclosed herein provides a technique to deliver the [27-row×9-col] matrix to a shader core of a GPU during a matrix-multiplication evaluation without either fetching or storing redundant information.

Convolutional operations, while basic building blocks for machine learning, are not well suited for a GPU. Systems on Chips (SOCs) may include dedicated fixed-function NPUs that provide a performance/watt throughput for convolutions that is more efficient than a GPU. Nevertheless, NPUs may not support all learning models and data types (FP32), and SOCs may rely on a general-purpose engine like a GPU for such machine learning models. There may be situations in which there is no NPU on a SOC, or in which both a NPU and GPU are used simultaneously for load balancing. For GPUs to support such learning models, convolutions may be re-cast as matrix multiplications, which may result in ~2× to ~9× increase in the corresponding memory footprint and data transfer overhead. Thus, conserving bandwidth by reducing the memory footprint associated with a convolution operation may have desirable qualities.

Figure 2:
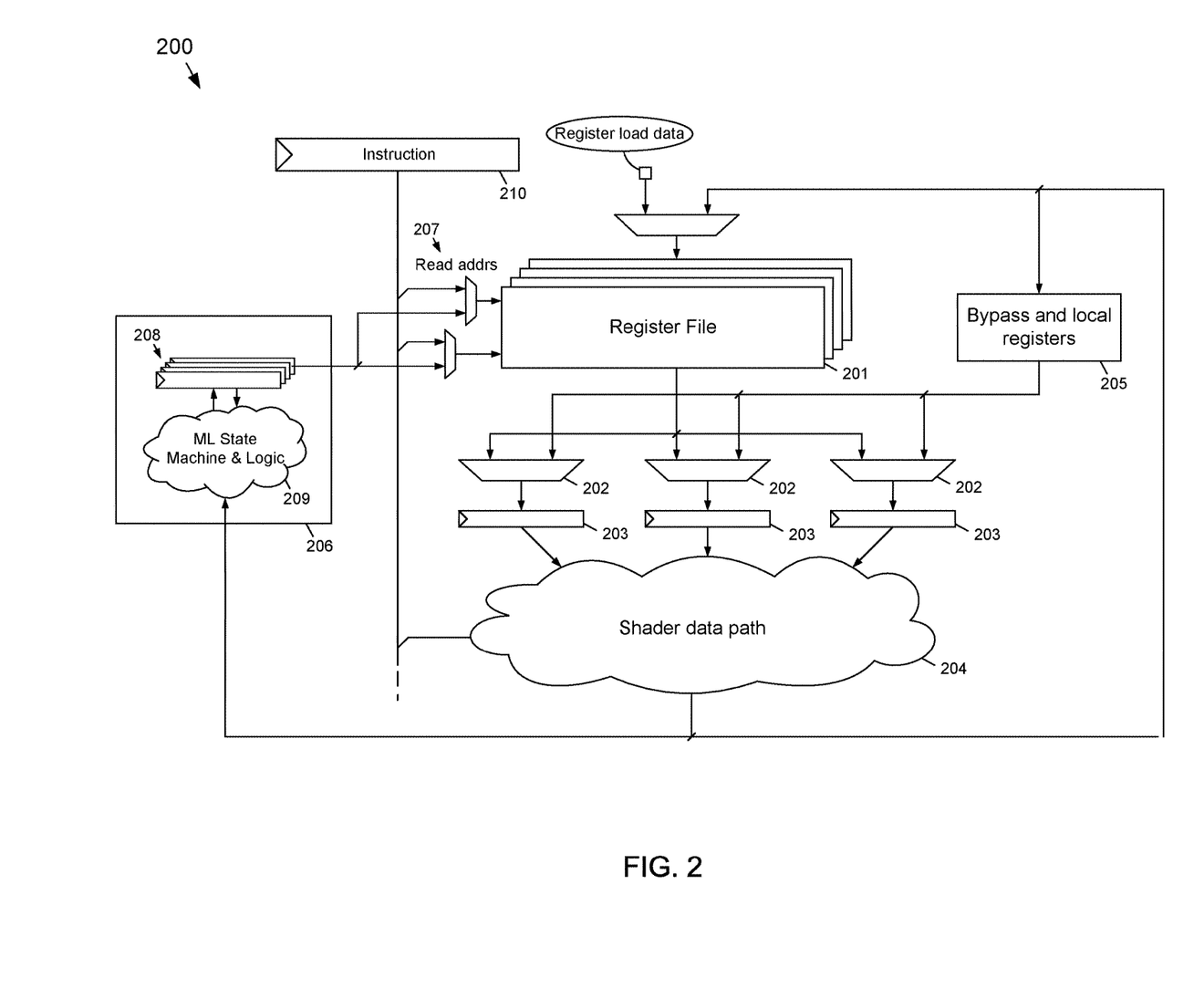
FIG. 2 depicts a functional block diagram of an example embodiment of a GPU that improves efficiency of accessing data 3D matrices that are often encountered in ML tasks according to the subject matter disclosed herein.

FIG. 2 depicts a functional block diagram of an example embodiment of a GPU 200 that improves efficiency of accessing data 3D matrices that are often encountered in ML tasks according to the subject matter disclosed herein. The GPU 200 includes a register file 201, multiple multiplexers 202, multiple staging registers 203, a shader data path 204, a bypass 205 to the multiplexers 202 and staging registers 203, a state machine 206, and read address multiplexers 207. The register file 201, the multiple multiplexers 202, the multiple staging registers 203, the shader data path 204, the bypass 205, and the read address multiplexers 207 may be arranged and interconnected as shown in FIG. 2. The shader data path 204 may represent a processing device, such as, but not limited to a shader core. The state machine 206 may include control registers 208 and fetch and return address generation logic 209.

An instruction decoder 210 may decode existing ISA instructions and each of the instruction set architecture (ISA) instructions shown in Tables 1-4 that are used to configure the state machine 206 and control operation when transforming, or recasting, a convolution operation into a matrix multiplication operation. The control registers 208 may receive parameter values from a host device (not shown) that control the fetch and return address generation logic 209 to generate addressing for elements of an input feature map and of a filter weight kernel to affect unrolling of the data as needed to cast the convolution operation as a matrix multiplication operation, and generate a return address for the resulting data.

One example embodiment may include the following ISA instructions:

TABLE 1

Initialization instructions for input feature map data

Set X dimension of image data (max value is an implementation decision)
Set Y dimension of image data (max value is an implementation decision)
Set number of components (e.g., RGB) of image data
Set memory stride for accessing image data
Set padding for accessing image data
Set transpose for accessing image data
Set depth of component of image data
Set base address of first image component
Set base address of second image component
Set base address of third image component

TABLE 2

Initialization instructions for input filter weight data

Set number of filters (max value is an implementation decision)
Set filter1 X dimension
Set filter1 Y dimension
Set depth of component data1 (i.e., 8-bit, 16-bit, 32-bit, etc.)
Set filter2 X dimension
Set filter2 Y dimension
Set depth of component data2
Set filter3 X dimension
Set filter3 Y dimension
Set depth of component data3

TABLE 3

Initialization instruction for output resultant data

Set base address of output data

TABLE 4

Instruction for operation during matrix multiplication

FETCH_ML (n, reg) Fetch next n registers of input data, starting to load at register number reg Operation of the GPU 200 includes three phases: an initialization phase, a fetch phase, and a streaming phase. The initialization phase may begin by a thread of a compute kernel initializing the registers 208 of the state machine 206 based on the convolution-compute problem at hand. For example, using the example input feature map data and filter weight data shown above in FIG. 1A, the X and Y dimensions may each be set to 5 using the Set X dimension of image data and the Set Y dimension of image data initialization instructions. The number of components may be set to 3 using the Set number of components initialization instruction. The stride may be set to 1 using the Set memory stride for accessing image data initialization instruction, and the depth of component may be set to 8-bits using the Set depth of component of image data initialization instruction. For the filter weights, the number of filters may be set to 2 using the Set number of filters initialization instruction. The X and Y dimensions may each be set to 3 using the Set filter X dimension and the Set filter Y dimension initialization instructions for both filters. Other parameters may also be set for both the input feature map data and the filter weight data. The memory addresses of where to encounter the input data and where to write return data arrive from the host (not shown) and are passed on to the control registers 208. The state machine 206 does not actually perform any fetches yet.

Once all the necessary parameters have been set up, and the state of the state machine 206 has been established, the fetch phase and the matrix multiplication begins by the state machine 206 issuing the FETCH_ML instruction to load n registers worth of data in the register file 201 with unrolled image feature map data while following the memory footprint of the original input images. In other words, rather than using a [9×27] matrix of input feature map data in the register file 201, only a [5×15] matrix of input feature map data may be used, which corresponds to performing an on-the-fly unrolling of the input feature map data and corresponding filter weight data, as shown in FIG. 1B. This results in accessing and caching of about only 30% of the data as compared to if the data were previously unrolled on the host side.

During the fetch phase, the FETCH_ML instruction may operate like a DMA engine loading data from a memory sub-system into a collection of registers (not shown) in the register file 201. Synchronization may be maintained similar to any traditional load instruction in order to ensure that dependent arithmetic instructions do not commence prior to the register file 201 being loaded with data. Matrix multiplication then begins normally.

The streaming phase occurs once the sequence has commenced. During the steaming phase, it may be possible to perform arithmetic on some registers while other registers are being loaded with new input data and weights, thereby creating a streaming engine.

By judiciously sizing the matrices that are to be computed via hierarchically breaking the input images into blocks, memory-system caches may be best utilized to maximize local cache coherency and avoid excessive misses for data that was recently in the cache, but still more recently overwritten. The state machine 206 may be configured to provide appropriate cache hints and, if supported by the memory system, requests for preloading data.

Another example embodiment may include hardware that may automatically keep track of subsequent arithmetic operations and key off of the subsequent operation to initiate subsequent fetches, thereby saving instruction slots for issuing further FETCH_ML instructions. The hardware of the state machine 206 may also be configured to assist during storing of computed filtered data to efficiently calculate addresses, thereby reducing total instruction count. The hardware of the state machine 206 may be varied to accommodate a variety of access patterns, including, for example, the im2col algorithm and MEC algorithms in addition to other patterns. Different amounts of hardware may be instantiated depending upon the situation to allow for direct handling of different scenarios of input feature maps and filter weight kernels. This feature may provide different design points with respect to area/power/perf tradeoffs. Generally, the hardware of the state-machine 206 may have sufficient flexibility to handle various output tensor return formats and will be capable of generating the address sequence for NHWC as:

$$\text{offset\_nhwc}(n,c,h,w) = n*HWC + h*WC + w*C + c$$

Figure 3:
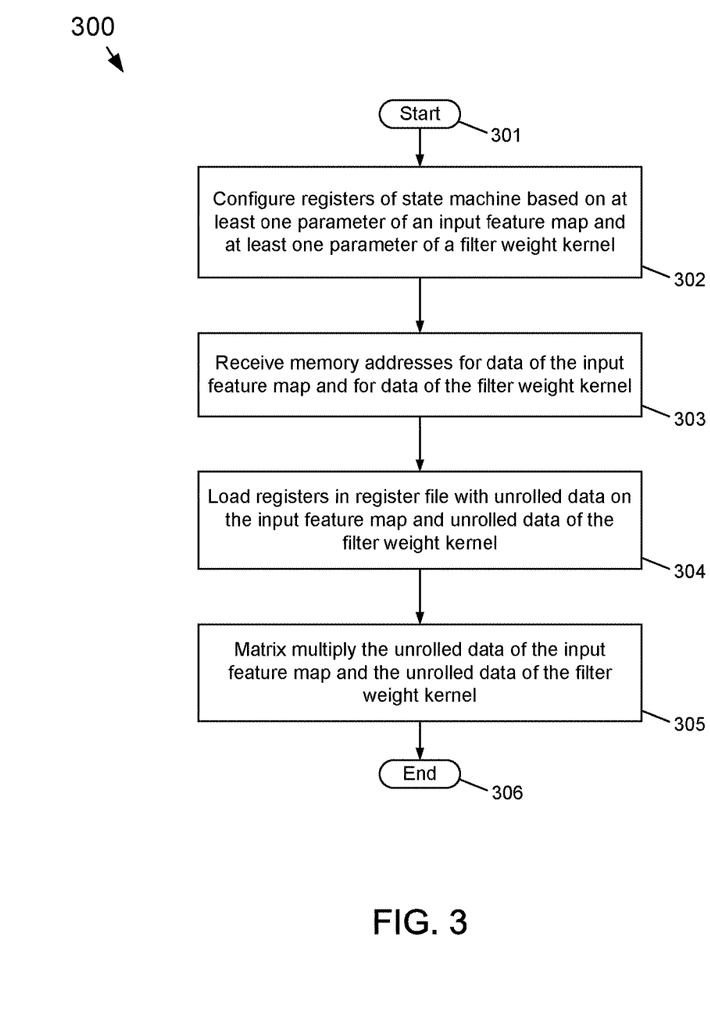
FIG. 3 is a flow diagram for an example method to perform a convolution operation in a GPU as a matrix multiply operation according to the subject matter disclosed herein.

FIG. 3 is a flow diagram for an example method 300 to perform a convolution operation in a GPU as a matrix multiply operation according to the subject matter disclosed herein. The process starts at 301. At 302, the registers 208 of the state machine 206 are initialized based on parameters of an input feature map and on parameters of a filter weight kernel. The initialization instructions contained in Tables 1 and 2 may be used to initialize the registers 208. In one embodiment, the input feature map parameters may relate to multiple input features maps and/or the parameters of the filter weight kernel may relate to multiple filter weight kernels. In another embodiment, the base address of the output data may also be initialized using the initialization instruction contained in Table 3.

At 303, addresses of the data for the input feature map(s) and the filter weight kernel(s) are received from a host device. At 304, registers in the register file of the GPU are loaded with unrolled input feature map data and unrolled filter weight kernel data in response to a FETCH_ML instruction (Table 4). The state machine 206 controls data flow from the register file 201 through the shader data path 204 to destination registers in the register file 201 by performing address calculations and controlling load/store operations. At 305, the unrolled input feature map data and the unrolled filter weight kernel data are matrix multiplied. In one embodiment, a first group of registers of the register file 201 may be used by the processor associated with the shader data path 204 to perform matrix multiplication while a second group of registers of the register file 201 is being loaded with input feature map data and filter weight data. After the second group of registers has been loaded, the data in the second group of registers may be used to perform matrix multiplication while the first group of registers are being loaded with new input feature map data and filter weight data. The process ends at 306 when the matrix multiplication operation is complete.

Although the subject matter disclosed herein has been described in connection with CNNs, it should be understood that the systems and methods disclosed herein are equally applicable to RNNs, GANs, and auto encoders. RNNs and GANs also use convolution operations as basic building blocks that are able to be recast as matrix multiplication operations. Further, and more generally still, the systems and methods disclosed herein may be extended to allow for various other access patterns of reading and writing operands that are not related to machine-learning algorithms.

Figure 4:
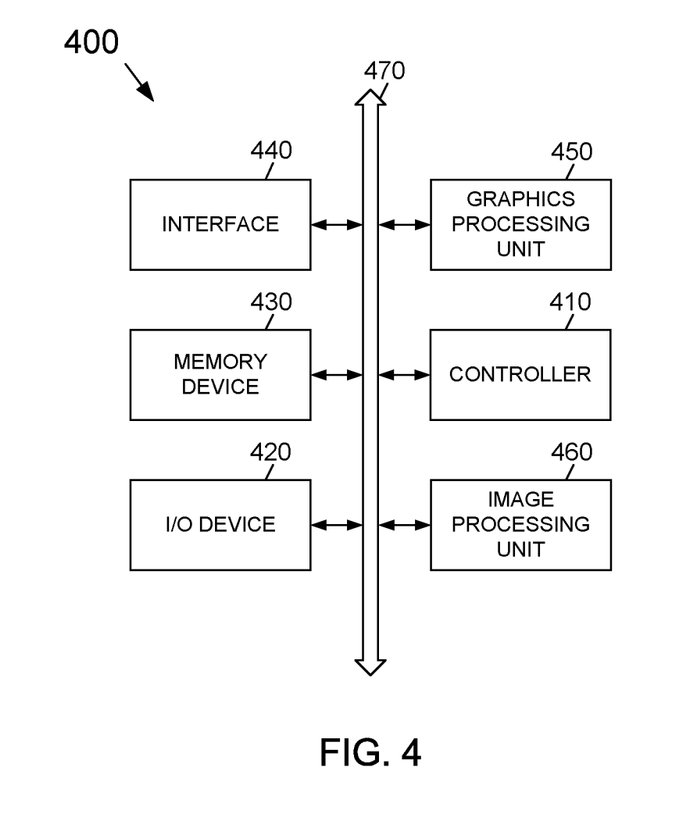
FIG. 4 depicts an electronic device that includes a GPU that performs a convolution operation recast as a matrix multiplication operation according to the subject matter disclosed herein.

FIG. 4 depicts an electronic device 400 that includes a GPU that performs a convolution operation recast as a matrix multiplication operation according to the subject matter disclosed herein. Electronic device 400 may be used in, but not limited to, a computing device, a personal digital assistant (PDA), a laptop computer, a mobile computer, a web tablet, a wireless phone, a cell phone, a smart phone, a digital music player, or a wireline or wireless electronic device. The electronic device 400 may include a controller 410, an input/output device 420 such as, but not limited to, a keypad, a keyboard, a display, a touch-screen display, a camera, and/or an image sensor, a memory 430, an interface 440, a GPU 450, and an imaging-processing unit 460 that are coupled to each other through a bus 470. The GPU 450 may perform a convolution operation recast as a matrix multiplication operation according to the subject matter disclosed herein. The controller 410 may include, for example, at least one microprocessor, at least one digital signal processor, at least one microcontroller, or the like. The memory 430 may be configured to store a command code to be used by the controller 410 or a user data.

Electronic device 400 and the various system components of electronic device 400 may include the image processing unit 460. The interface 440 may be configured to include a wireless interface that is configured to transmit data to or receive data from a wireless communication network using a RF signal. The wireless interface 440 may include, for example, an antenna. The electronic system 400 also may be used in a communication interface protocol of a communication system, such as, but not limited to, Code Division Multiple Access (CDMA), Global System for Mobile Communications (GSM), North American Digital Communications (NADC), Extended Time Division Multiple Access (E-TDMA), Wideband CDMA (WCDMA), CDMA2000, Wi-Fi, Municipal Wi-Fi (Muni Wi-Fi), Bluetooth, Digital Enhanced Cordless Telecommunications (DECT), Wireless Universal Serial Bus (Wireless USB), Fast low-latency access with seamless handoff Orthogonal Frequency Division Multiplexing (Flash-OFDM), IEEE 802.20, General Packet Radio Service (GPRS), iBurst, Wireless Broadband (WiBro), WiMAX, WiMAX-Advanced, Universal Mobile Telecommunication Service—Time Division Duplex (UMTS-TDD), High Speed Packet Access (HSPA), Evolution Data Optimized (EVDO), Long Term Evolution-Advanced (LTE-Advanced), Multichannel Multipoint Distribution Service (MMDS), Fifth-Generation Wireless (5G), and so forth.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of, data-processing apparatus. Alternatively or additionally, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A graphics processing unit (GPU), comprising:
   a register file that stores data of an input feature map and data of a filter weight kernel;
   a processor that performs a convolution operation on data of the input feature map and data of the filter weight kernel as a matrix multiplication operation; and
   a state machine that facilitates performance of the convolution operation by unrolling the data of the input feature map and the data of the filter weight kernel in the register file.

2. The GPU of claim 1, wherein the state machine comprises control registers that determine movement of data through the register file to facilitate performance of the matrix multiplication operation on the data in the register file in an unrolled manner, the control registers being configured based on at least one parameter of an input feature map and at least one parameter of a filter weight kernel.

3. The GPU of claim 2, wherein state machine receives the at least one parameter of an input feature map and the at least one parameter of a filter weight kernel from at least one instruction set architecture (ISA) instruction.

4. The GPU of claim 1, wherein the unrolled data of the input feature map and the unrolled data of the filter weight kernel is unrolled based on one of an im2col technique and a Memory-Efficient Convolution (MEC) technique.

5. The GPU of claim 1, wherein the state machine further facilitates matrix multiplying of unrolled data of the input feature map and unrolled data of the filter weight kernel in a first group of registers of the register file while loading a second group of registers of the register file with the unrolled data of the input feature map and the unrolled data of the filter weight kernel, and facilitates matrix multiplying the unrolled data of the input feature map and the unrolled data of the filter weight kernel in the second group of registers of the register file.

6. The GPU of claim 5, wherein the state machine further repeatedly facilitates the matrix multiplication operation on the unrolled data of the input feature map and the unrolled data of the filter weight kernel until the matrix multiplication is complete by facilitating matrix multiplication of the unrolled data of the input feature map and the unrolled data of the filter weight kernel in the first group of registers of the register file while loading the second group of registers of the register file with the unrolled data of the input feature map and the unrolled data of the filter weight kernel, and facilitating matrix multiplication of the unrolled data of the input feature map and the unrolled data of the filter weight kernel in the second group of registers of the register file while loading the first group of registers of the register file with the unrolled data of the input feature map and the unrolled data of the filter weight kernel.

7. The GPU of claim 1, wherein the convolution operation comprises an operation of one of a convolutional neural network (CNN), a recurrent neural network (RNN), a generative adversarial network (GAN), and an auto encoder.

8. A graphics processing unit (GPU), comprising:
   a register file that stores data of an input feature map and data of a filter weight kernel;
   a shader data path; and
   a state machine that facilitates a convolution operation to be performed by the shader data path as a matrix multiplication operation by unrolling data and storing the unrolled data in the register file and controlling data movement from the register file and through the shader data path to perform the matrix multiplication operation, the unrolled data comprising the data of the input feature map and the data of the filter weight kernel.

9. The GPU of claim 8, wherein the state machine comprises control registers that determine movement of data through the register file and the shader data path to perform the matrix multiplication operation on the data in the register file in an unrolled manner, the control registers being configured based on at least one parameter of an input feature map and at least one parameter of a filter weight kernel.

10. The GPU of claim 9, wherein the state machine receives the at least one parameter of an input feature map and the at least one parameter of a filter weight kernel from at least one instruction set architecture (ISA) instruction.

11. The GPU of claim 8, wherein the unrolled data of the input feature map and the unrolled data of the filter weight kernel being unrolled based on one of an im2col technique or a Memory-Efficient Convolution (MEC) technique.

12. The GPU of claim 8, wherein the state machine further facilitates matrix multiplying of unrolled data of the input feature map and unrolled data of the filter weight kernel in a first group of registers of the register file while loading a second group of registers of the register file with the unrolled data of the input feature map and the unrolled data of the filter weight kernel, and facilitates matrix multiplying the unrolled data of the input feature map and the unrolled data of the filter weight kernel in the second group of registers of the register file.

13. The GPU of claim 12, wherein the state machine further repeatedly facilitates the matrix multiplication operation on the unrolled data of the input feature map and the unrolled data of the filter weight kernel until the matrix multiplication is complete by facilitating matrix multiplication of the unrolled data of the input feature map and the unrolled data of the filter weight kernel in the first group of registers of the register file while loading the second group of registers of the register file with the unrolled data of the input feature map and the unrolled data of the filter weight kernel, and facilitating matrix multiplication of the unrolled data of the input feature map and the unrolled data of the filter weight kernel in the second group of registers of the register file while loading the first group of registers of the register file with the unrolled data of the input feature map and the unrolled data of the filter weight kernel.

14. The GPU of claim 8, wherein the convolution operation comprises an operation of one of a convolutional neural network (CNN), a recurrent neural network (RNN), a generative adversarial network (GAN), and an auto encoder.

15. A method to perform a convolution operation in a graphics processing unit (GPU) as a matrix multiply operation, comprising:
configuring registers of a state machine in the GPU based at least one parameter of an input feature map and at least one parameter of a filter weight kernel, the input feature map to be convolved by the filter weight kernel;
receiving memory addresses for data of the input feature map and for data of the filter weight kernel;
issuing, by the state machine, an instruction to load registers in a register file of the GPU with unrolled data of the input feature map and unrolled data of the filter weight kernel; and
matrix multiplying the unrolled data of the input feature map and the unrolled data of the filter weight kernel.

16. The method of claim 15, wherein the unrolled data of the input feature map and the unrolled data of the filter weight kernel are unrolled based on one of an im2col technique and a Memory-Efficient Convolution (MEC) technique.

17. The method of claim 15, wherein configuring the registers of the state machine in the GPU further comprises:
receiving the at least one parameter of the input feature map and the at least one parameter of the filter weight kernel from at least one instruction set architecture (ISA) instruction; and
configuring the registers of the state machine in the GPU in response to the at least one ISA instruction.

18. The method of claim 15, wherein matrix multiplying the unrolled data of the input feature map and the unrolled data of the filter weight kernel comprises:
matrix multiplying the unrolled data of the input feature map and the unrolled data of the filter weight kernel in a first group of registers of the register file while loading a second group of registers of the register file with the unrolled data of the input feature map and the unrolled data of the filter weight kernel; and
matrix multiplying the unrolled data of the input feature map and the unrolled data of the filter weight kernel in the second group of registers of the register file.

19. The method of claim 18, further comprising, until the matrix multiply operation on the unrolled data of the input feature map and the unrolled data of the filter weight kernel is complete, repeatedly:
matrix multiplying the unrolled data of the input feature map and the unrolled data of the filter weight kernel in the first group of registers of the register file while loading the second group of registers of the register file with the unrolled data of the input feature map and the unrolled data of the filter weight kernel; and
matrix multiplying the unrolled data of the input feature map and the unrolled data of the filter weight kernel in the second group of registers of the register file while loading the first group of registers of the register file with the unrolled data of the input feature map and the unrolled data of the filter weight kernel.

20. The method of claim 15, wherein the convolution operation comprises an operation of one of a convolutional neural network (CNN), a recurrent neural network (RNN), a generative adversarial network (GAN), and an auto encoder.

* * * * *